(12) United States Patent
Caretti et al.

(10) Patent No.: US 8,467,731 B2
(45) Date of Patent: Jun. 18, 2013

(54) RADIO RESOURCE SCHEDULING FOR INTRA-SYSTEM INTERFERENCE COORDINATION IN WIRELESS COMMUNICATION SYSTEMS

(75) Inventors: Marco Caretti, Turin (IT); Ivano Salvatore Collotta, Turin (IT); Maurizio Fodrini, Turin (IT); Paolo Priotti, Turin (IT); Roberto Rossi, Turin (IT)

(73) Assignee: Telecom Italia S.p.A., Milan (IT)

( * ) Notice: Subject to any disclaimer, the term of this patent is extended or adjusted under 35 U.S.C. 154(b) by 0 days.

(21) Appl. No.: 13/503,985

(22) PCT Filed: Oct. 26, 2009

(86) PCT No.: PCT/IT2009/000481
§ 371 (c)(1),
(2), (4) Date: Apr. 25, 2012

(87) PCT Pub. No.: WO2011/051981
PCT Pub. Date: May 5, 2011

(65) Prior Publication Data
US 2012/0238263 A1    Sep. 20, 2012

(51) Int. Cl.
*H04B 1/00*    (2006.01)
(52) U.S. Cl.
USPC .......... 455/63.1; 455/69; 455/452.2; 455/447
(58) Field of Classification Search
USPC ............. 455/464, 422.1, 463, 468, 450–453, 455/509, 63.1, 446, 447; 370/431, 329, 350
See application file for complete search history.

(56) References Cited

U.S. PATENT DOCUMENTS

| | | | |
|---|---|---|---|
| 5,239,557 A * | 8/1993 | Dent | 370/342 |
| 5,455,821 A * | 10/1995 | Schaeffer et al. | 370/332 |
| 5,475,868 A | 12/1995 | Duque-Anton | |
| 5,740,536 A * | 4/1998 | Benveniste | 455/447 |
| 5,752,164 A * | 5/1998 | Jones | 455/454 |
| 5,963,584 A | 10/1999 | Boulanger | |
| 6,223,041 B1 | 4/2001 | Egner | |
| 6,628,707 B2 * | 9/2003 | Rafie et al. | 375/233 |

(Continued)

FOREIGN PATENT DOCUMENTS

| | | |
|---|---|---|
| EP | 0 585 994 A2 | 3/1994 |
| WO | WO 03/061318 A1 | 7/2003 |

(Continued)

OTHER PUBLICATIONS

International Search Report from the European Patent Office in International Application No. PCT/IT2009/000481 mailed Aug. 13, 2010.

*Primary Examiner* — Sharad Rampuria
(74) *Attorney, Agent, or Firm* — Finnegan, Henderson, Farabow, Garrett & Dunner, L.L.P.

(57) ABSTRACT

A radio resource scheduling method for scheduling radio resources used for communications in a radio communication system includes user equipment configured to communicate with transceiver stations on the radio resources. The transceiver stations are configured to exchange coordination messages concerning radio resources affected by intra-system interference. The radio resource scheduling method includes allocating to each user equipment served by a transceiver station a corresponding radio resource and a corresponding transmission power level to communicate with the serving transceiver station. Allocating is based on coordination messages exchanged by the serving transceiver station.

16 Claims, 1 Drawing Sheet

U.S. PATENT DOCUMENTS

| | | | |
|---|---|---|---|
| 6,751,444 B1* | 6/2004 | Meiyappan | 455/69 |
| 6,865,166 B1* | 3/2005 | Wilcoxson et al. | 370/330 |
| 7,602,837 B2* | 10/2009 | Kotecha et al. | 375/148 |
| 8,078,111 B2* | 12/2011 | Jovicic et al. | 455/63.1 |
| 8,170,574 B2* | 5/2012 | Kim et al. | 455/452.2 |
| 8,229,451 B2* | 7/2012 | Frenger et al. | 455/452.2 |
| 8,295,778 B2* | 10/2012 | Kotecha et al. | 455/69 |
| 8,340,038 B2* | 12/2012 | Guvenc | 370/329 |
| 8,346,173 B2* | 1/2013 | Chen et al. | 455/63.1 |
| 2009/0061842 A1* | 3/2009 | Park et al. | 455/422.1 |
| 2010/0029282 A1* | 2/2010 | Stamoulis et al. | 455/436 |
| 2010/0128618 A1 | 5/2010 | Simonsson | |
| 2012/0052812 A1* | 3/2012 | Frei | 455/63.1 |
| 2012/0115520 A1* | 5/2012 | Rossel et al. | 455/501 |
| 2012/0163223 A1* | 6/2012 | Lo et al. | 370/252 |
| 2012/0231742 A1* | 9/2012 | Barberis et al. | 455/63.1 |
| 2012/0314665 A1* | 12/2012 | Ishida et al. | 370/329 |

FOREIGN PATENT DOCUMENTS

| | | |
|---|---|---|
| WO | WO 2008/095543 A1 | 8/2008 |
| WO | WO 2008/096383 A1 | 8/2008 |
| WO | WO 2008/130297 A1 | 10/2008 |
| WO | WO 2011/051980 | 5/2011 |

* cited by examiner

RADIO RESOURCE SCHEDULING FOR INTRA-SYSTEM INTERFERENCE COORDINATION IN WIRELESS COMMUNICATION SYSTEMS

CROSS REFERENCE TO RELATED APPLICATION

This application is a national phase application based on PCT/IT2009/000481, filed Oct. 26, 2009, the content of which is incorporated herein by reference.

TECHNICAL FIELD OF THE INVENTION

The present invention relates in general to wireless communication systems, and more specifically to intra-system interference coordination in cellular and non-cellular radio communication systems.

In particular, cellular radio communication systems where the present invention may find advantageous, but not limitative application, are for example the so-called beyond-3G (3rd Generation) cellular radio communication systems, i.e. new generation cellular radio communication systems having a wider transmission bandwidth than 3G cellular radio communication systems, such as for example those known as Third Generation Partnership Project Long Term Evolution (3GPP LTE) cellular radio communication systems.

Non-cellular radio communication systems where the present invention may find advantageous, but not limitative application are for example Wireless Local Area Networks (WLANs), and in particular WiMAX.

BACKGROUND ART

Cellular phone systems and portable/mobile user equipments/terminals based on cellular radio communication have evolved in the past years from analogue, narrowband Frequency Division Multiple Access (FDMA) transmission ($1^{st}$ generation (1G) cellular radio communication systems), first to digital, narrowband Frequency and Time Division Multiple Access (FDMA/TDMA) transmission ($2^{nd}$ generation (2G) cellular radio communication systems), and later to digital, broadband Code Division Multiple Access (CDMA) transmission (3rd generation (3G) cellular radio communication systems).

Further evolution, that will include but will not be limited to the adoption of higher data rates, will be based on an improvement of spectral efficiency of transmission systems. However, given the limits of reasonably achievable spectral efficiency, an increase in transmission bandwidth is foreseen for future generations of cellular phone systems.

Accordingly, research is moving towards new generation cellular radio communication systems having a wider transmission bandwidth than 3G cellular radio communication systems, such as for example those known as 3GPP LTE cellular radio communication systems.

In particular, when transmission bandwidth increases, transceivers typically show an increase in their circuit complexity, depending on the type of modulation and multiplexing used. For instance, 3G cellular radio communication systems based on CDMA operate effectively on bandwidths up to several MHz, 10 MHz being often considered an upper limit for the bandwidth of low-cost commercial CDMA equipments using a RAKE receiver or other Single Carrier (SC) receivers with a time-domain equalizer.

When the bandwidth of the transmission systems becomes larger than a few MHz (about 10 MHz), a multi-carrier modulation is often more suitable to keep the transceivers circuit complexity as low as possible.

In particular, Orthogonal Frequency Division Multiplexing (OFDM) has proved to be particularly suited to use with cost-efficient transceivers that process signals in the frequency domain both on the transmitting and receiving sides. More in detail, OFDM is based upon the principle of Frequency Division Multiplexing (FDM), but is implemented as a digital modulation scheme.

Specifically, the bit stream to be transmitted is split into several parallel bit streams, typically dozens to thousands. The available frequency spectrum is divided into several sub-channels, and each low-rate bit stream is transmitted over one sub-channel by modulating a sub-carrier using a standard modulation scheme, for example PSK, QAM, etc. The sub-carrier frequencies are chosen so that the modulated data streams are orthogonal to each other, meaning that cross-talk between the sub-channels is eliminated. This orthogonality occurs when sub-carriers are equally spaced by the symbol rate of a sub-carrier. OFDM exploits frequency spectrum in a particularly efficient way, thanks to the fact that sub-carriers do not interfere reciprocally even if they have partially overlapping spectra. OFDM also allows to largely simplify Multi-Input-Multi-Output (MIMO) receivers compared to SC systems, MIMO receivers being needed as one of fundamental elements to increase the spectral efficiency.

Moreover, in OFDM, transition from frequency to time domain, and vice versa, is typically performed with relatively low-complexity Inverse Fast Fourier Transform (IFFT) and Fast Fourier Transform (FFT) circuits.

The primary advantage of OFDM is its capability to cope with severe channel conditions—for example, multi-path and narrowband interference—without complex equalization filters. Channel equalization is simplified by using many slowly modulated narrowband signals instead of one rapidly modulated wideband signal. 3GPP LTE cellular radio communication systems adopt an OFDM-based physical layer. In particular, 3GPP LTE cellular radio communication systems will have an OFDM-based downlink and a SC-FDMA-based uplink.

Outside the cellular radio communication systems, transceivers have evolved earlier towards large bandwidths. For example WLANs complying with the IEEE802.11 standard family use a 20 MHz channel, and transmit with a 64-subcarrier OFDM modulation. More specifically, in WLANs, transmission is governed by a Medium Access Control (MAC) protocol, called Carrier Sense Multiple Access with Collision Avoidance (CSMA-CA), that avoids transmission when a given frequency channel is already in use. For this reason, inside a given WLAN cell, there is usually no direct co-channel interference between different transceivers. Moreover, in a hot-spot kind of territory coverage, WLAN cells are usually physically separated, so that other-cell interference is largely limited in most cases.

However, in 3GPP LTE cellular radio communication systems, OFDM is expected to work in a very different environment compared to WLANs.

In fact, in a cellular radio communication system, where a continuous radio coverage is required, the signal transmitted by a transceiver station in downlink (DL) or by a terminal or User Equipment (UE) in uplink (UL) can overlap the service area of neighbouring cells. Demands for high spectral efficiency, on the other hand, practically prevent the adoption of high frequency reuse like in 2G cellular radio communication systems, so that it is expected that for example in 3GPP LTE cellular radio communication systems the frequency reuse factor will be low, if not unitary. In 3GPP LTE cellular radio communication systems it is likely that especially at the cell edge very strong co-channel, intra-system interference will be present, substantially lowering user throughput, if not properly mitigated.

An equivalent interference scenario, but in TDD, could arise e.g. in IEEE802.16 and IEEE802.20 networks and similar.

Inter-cell interference can be avoided or mitigated by layer 2 mechanisms, such as Radio Resource Management (RRM) mechanisms (i.e. interference coordination) and intelligent packet scheduling mechanisms, or by layer 1 mechanisms, such as spatial suppression by means of multiple antennas and cancellation based on detection/subtraction of the inter-cell interference. A classification of these mechanisms can be found for example in 3GPP TR 25.814 "Physical layer aspect for evolved. Universal Terrestrial Radio Access (UTRA)" sec. 7.1.2.6.

OBJECT AND SUMMARY OF THE INVENTION

The Applicant has noted that while in CDMA-based radio interfaces there is an intrinsic protection against inter-cell, intra-system interference, in LTE no direct protection embedded in the radio interface exists. Moreover, network architecture in LTE has been simplified in comparison with 3G, in that there is no RNC (Radio Network Controller), and many of the centralised functions which had been implemented in RNC have been de-centralized (distributed) in the Node Bs (identified in LTE as "evolved-Node Bs" or "e-Node Bs"). Also RRM is included among those functions. As such, it is not expected to have in LTE a centralized control of interference coordination.

Moreover, assuming that in the 3GPP LTE cellular radio communication system an Inter-Cell Interference Coordination (ICIC) is performed, the Applicant has also noted that, since the RRM mechanisms have been de-centralized in and, hence, are performed by each e-Node B, the ICIC can operate effectively and successfully only in case that the e-Node Bs perform a radio resource scheduling designed to support the ICIC.

In fact, every e-Node B schedules and, accordingly, allocates radio resources to respective served user equipments with a granularity of one Transmission Time Interval (TTI) in time domain, one TTI being made up of a number of consecutive OFDM symbols and having a fixed length, while the ICIC, generally, operates in cycles having a periodicity much longer than the duration of one TTI, for example an ICIC period can lasts for tens to hundreds of TTIs.

Therefore, the radio resource scheduling process evolves extremely more rapidly than the ICIC process. However, allocations of the radio resources to user equipments have a direct effect on inter-cell interference, and average interference power, in turn, influences ICIC via user equipment measurements.

In summary, ICIC and scheduling are two mechanisms reciprocally influencing each other.

Every variation which is faster than one ICIC period, virtually goes beyond the control of ICIC. ICIC will only see the effect of variations in the interference smoothed out by time averaging. ICIC itself can operate effectively only in case that the interference scenario is relatively constant. As the interference scenario is largely dependent on the scheduling situation of interfering e-Node Bs, it results that, as previously said, ICIC cannot operate successfully without a scheduling policy designed to support ICIC.

Finally, the Applicant has further noted that traditional schedulers (round robin, maximum Carrier-to-Interface (C/I), proportional fair, etc.) are completely free to alter radio resource allocations at every TTI without considering any ICIC mechanism, and that, therefore, the traditional schedulers don't allow ICIC to operate effectively and successfully.

The objective of the present invention is then to provide a radio resource scheduling methodology which, in general, can alleviate at least some of the above cited drawbacks, and which, in particular, supports ICIC to operate effectively and successfully.

This objective is achieved by the present invention in that it relates to a method for scheduling radio resources in a radio communication system, a system and a computer program configured to implement said method for scheduling radio resources, a computer program product comprising a computer-readable medium having such a computer program stored therein, and a network apparatus for use in a Node B and/or in a e-Node B and storing such a computer program, as defined in the appended claims.

The present invention achieves the aforementioned objective by a radio resource scheduling method for scheduling radio resources used for communications in a radio communication system which comprises user equipments configured to communicate with transceiver stations on said radio resources, the transceiver stations being configured to exchange coordination messages concerning radio resources affected by intra-system interference, the radio resource scheduling method comprising:

allocating to each user equipment served by a serving transceiver station a corresponding radio resource and a corresponding transmission power level to communicate with said serving transceiver station, allocating being based on coordination messages exchanged by said serving transceiver station.

In particular, allocating to each user equipment served by a serving transceiver station a corresponding radio resource and a corresponding transmission power level to communicate with said serving transceiver can comprise:

generating a plurality of candidate allocations, each candidate allocation comprising corresponding assignments to said user equipments served by said serving transceiver station of respective radio resources, each assignment comprising a corresponding assigned transmission power level;

choosing among said candidate allocations a candidate allocation based on said coordination messages exchanged by said serving transceiver station; and allocating to each of said user equipments served by said serving transceiver station a corresponding radio resource and a corresponding transmission power level according to the assignments comprised in said chosen candidate allocation.

Preferably, the radio resource scheduling method further comprises:

determining, for each candidate allocation, scores of the corresponding assignments based on quantities indicative of transmission capacities associated with said corresponding assignments, on said coordination messages exchanged by said serving transceiver station, and on the assigned transmission power levels comprised in said corresponding assignments.

Conveniently, determining, for each candidate allocation, scores of the corresponding assignments comprises:

determining, for each assignment, a corresponding score based on a first quantity indicative of a transmission capacity associated with the assignment, on any coordination message(s) exchanged by said serving transceiver station and concerning the radio resource assigned in the assignment, on the assigned transmission power level comprised in the assignment, and on a target power level computed on the basis of any coordination message(s) exchanged by said serving transceiver station and concerning the radio resource assigned in the assignment.

Moreover, according to a first embodiment of the present invention, the radio resource scheduling method further comprises:

computing a total score of each candidate allocation based on the scores of the corresponding assignments;
    choosing among said candidate allocations a candidate allocation comprising:
        choosing among said candidate allocations a candidate allocation based on the computed total scores.

Furthermore, according to a second embodiment of the present invention, determining, for each assignment, a corresponding score comprises;

determining the corresponding score further based on a set of temporally previous transmission power levels previously allocated to communicate on the radio resource which is currently assigned in the assignment;
    the radio resource scheduling method further comprising:
    computing a total score of each candidate allocation based on the scores of the corresponding assignments;
    choosing among said candidate allocations a candidate allocation comprising:
        choosing among said candidate allocations a candidate allocation based on the computed total scores.

Finally, according to a third embodiment of the present invention, each candidate allocation comprises corresponding temporally subsequent potential assignments to said user equipments served by said serving transceiver station of respective radio resources, each temporally subsequent potential assignment comprising a corresponding temporally subsequent potential assigned transmission power level; the radio resource scheduling method further comprising:

determining, for each candidate allocation, also scores of the corresponding temporally subsequent potential assignments based on quantities indicative of transmission capacities associated with said corresponding temporally subsequent potential assignments, on said coordination messages exchanged by said serving transceiver station, and on the temporally subsequent potential assigned transmission power levels comprised in said corresponding temporally subsequent potential assignments; and
    computing a total score of each candidate allocation based on the scores of the corresponding assignments and on the scores of the corresponding temporally subsequent potential assignments;
    choosing among said candidate allocations a candidate allocation comprising:
        choosing among said candidate allocations a candidate allocation based on the computed total scores.

BRIEF DESCRIPTION OF THE DRAWING

For a better understanding of the present invention, preferred embodiments, which are intended purely by way of example and are not to be construed as limiting, will now be described with reference to the attached FIGURE (not to scale) which shows a flow chart of a radio resource scheduling method according to the present invention.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed.

Thus, the present invention is not intended to be limited to the embodiments shown, but is to be accorded the widest scope consistent with the principles and features disclosed herein and defined in the appended description and claims. Moreover, the present invention is implemented by means of a software program, loadable in a memory of an electronic processor, and comprising software code portions for implementing, when the software program is run on the electronic processor, the radio resource scheduling method described hereinafter.

Additionally, in the following, without losing generality, specific reference will be made to a 3GPP LTE cellular radio communication system, remaining clear that the present invention can also be applied to other type of cellular or non-cellular systems such as WiMAX or WLANs. For this reason, when referring to a transceiver station being part of the network infrastructure, the terminology "evolved-Node B" (e-Node B), that is the terminology commonly adopted in 3GPP LTE cellular radio communication systems, will be used.

In general, the present invention applies to wireless communication systems wherein radio interface between base stations, such as e-node Bs, and mobile stations, such as User Equipments (UEs), is based on a physical layer with multi-carrier transmission, and sensitive to inter-cell interference.

In the following, in the wireless communication system under consideration, an assumption is made that a downlink of a 3GPP Evolved-UMTS terrestrial Radio Access Network (E-UTRAN) LTE system is adopted, remaining clear that the present invention is applicable to other cellular and non-cellular systems based on OFDM or other multi-carrier transmission.

In particular, for sake of simplicity, in the following the present invention will be described making explicit reference to downlink case, remaining clear that a similar method can be applied to uplink case.

Moreover, another assumption is made that the 3GPP E-UTRAN LTE system uses a given frequency band wherein each e-Node B can allocate resources to users with a granularity of one Physical Resource Block (PRB) in the frequency domain, i.e., a PRB being minimum allocation unit for a scheduler of a e-Node B, and one Transmission Time Interval (TTI) in the time domain, one TTI being made up of a number of consecutive OFDM symbols and having a fixed length. However the present invention is applicable also in case of variable-length TTIs. In the 3GPP E-UTRAN LTE system under consideration it is not possible to allocate one PRB to a certain user for a time shorter than a TTI. However the present invention is applicable also to systems wherein resource allocation has a finer resolution in the time dimension.

Furthermore, in the following, again without loosing generality, only concentrated PRBs, which are continuous sets of adjacent sub-carriers, and have fixed dimension in the frequency domain, i.e., a constant number of sub-carriers per PRB, will be considered.

Additionally, a further assumption is made that an Inter-Cell Interference Coordination (ICIC) is performed in the 3GPP E-UTRAN LTE system under consideration, and that each UE in the 3GP-P E-UTRAN LTE system under consideration periodically sends via uplink signalling to a respective serving e-Node B values of Channel Quality. Indicator (CQI) for those PRBs which have currently the highest transmission channel quality for the UE.

Preferably, the ICIC performed in the 3GPP E-UTRAN LTE system under consideration is based on a characterization of inter-cell interference performed by e-Node Bs.

Relating to this, example of characterization of downlink interference is disclosed in Applicant's international patent application PCT/EP2007/051302 filed on Sep. 2, 2007 and having title "Characterization of co-channel interference in a wireless communication system", while an example of characterization of uplink interference is disclosed in Applicant's international patent application PCT/IT2007/000695 filed on Mar. 10, 2007 and having title "Characterization of uplink co-channel interference in a wireless communication system, in particular a cellular radio communication system". Those documents teach how to bring knowledge to the transmitting elements in a network about who generates interference they are experiencing. The whole process is carried out with a very low additional hardware complexity in handheld terminals. Moreover, signalling overhead on radio interface is minimal, and equally very limited network signalling is required on X2 interface, which is a network interface provided in the 3GPP LTE for allowing direct communications between e-Node Bs (see 3GPP Technical Specification (TS) 36.300).

In brief, according to the above referenced Applicant's international patent applications, UEs in the 3GPP E-UTRAN LTE system under consideration provide respective serving e-Node Bs with information necessary to reconstruct interference scenario of respective serving cells.

In particular, it is assumed that with a certain time periodicity every e-Node B transmits a cell-specific pilot signals sequence:

$$T_i = \{\theta_1, \ldots, \theta_\tau\} \quad (1)$$

where $\tau$ is the sequence length.

Additionally, it is also assumed that for a given considered UE there are Q interfering e-Node Bs, i.e., those e-Node Bs which use the same set or subset of PRBs of the e-Node B serving the considered UE and which can be considered as the potential main interferers for that UE.

In particular, the main interfering e-node Bs comprise both disturbing or disturbed e-Node Bs in relation with the serving e-Node B under consideration. In a simple and ideal network with hexagonal cells (or sectors), the main interfering e-node Bs are usually a subset of the first or first-and-second tiers of e-Node Bs. More difficult is definition of main interferers in a network with complicated topology, and should be based on case-by-case measurements.

Moreover, it is also assumed that the considered UE has knowledge of the Q pilot signals sequences of those main interfering e-Node Bs. The UE will then be able to periodically measure the received power for each of the Q known pilot signals sequences.

The quantities measured by the UE take the form:

$$\varphi_{nk} = \{p_1, \ldots, p_Q\} \quad (2)$$

where n is a time instant and k is an index identifying the UE. Moreover, let us assume that the measured powers are actually average powers over a given time duration which can coincide with a cycle time of ICIC or can be a fraction of the same.

Supposing that all e-Node Bs transmit the same pilot signal power, the vector of measured powers is inversely proportional to the long-term average attenuation experienced by the pilot signal of each interferer. In decibel, inversion becomes a change of sign:

$$A_{nk} + \{\pi_p + \eta - p_1, \ldots, \pi_p + \eta - p_Q\} = \{a_{k1}^{(n)}, \ldots, a_{kQ}^{(n)}\} \quad (3)$$

where $A_{nk}$ is the attenuation vector, $\pi_p$ represents pilot signal power at the transmit antenna, $\eta$ is an optional term used for power normalization in the system, which might also take into account a possible power control mechanism on the pilot signal.

The k-th UE periodically feedbacks the attenuation vector $A_{nk}$ to the serving e-Node B. The serving e-Node B can store the attenuation vector $A_{nk}$ as it is, or can apply to it a vector quantization process as described in the above referenced Applicant's international patent applications.

Each one of the neighboring e-Node Bs then signals to the serving e-Node B, via the X2 interface, the vector:

$$\underline{P_i} = \{\pi_{i1}, \ldots, \pi_{iN}\} \quad (4)$$

where i is an index identifying the neighboring e-Node B, N is the total number of PRBs, and $\pi_{ij}$ is the power that the i-th e-Node B transmits on the j-th PRB. Depending on signalling conventions, value $\pi_{ij}=0$ could be used to indicate that the i-th e-Node B does not use the j-th PRB. $\pi_{ij}$ can be also a quantized version of the transmitted power.

These signalling aspects belong to the same category of the inter-e-Node B signalling for ICIC purpose defined in 3GPP TS 36.423—Evolved Universal Terrestrial Radio Access Network (E-UTRAN); X2 Application Protocol (X2AP).

Therefore, for each time instant n, interference power sustained by the k-th UE in the m-th PRB can be estimated by the serving e-Node B as (in logarithmic units):

$$\sigma_{km} = 10\log_{10}\sum_{i=1}^{Q} 10^{\frac{\pi_{im}-a_{ki}}{10}} \quad (5)$$

where time-dependency (index n) has been intentionally dropped in all the terms. The equation (5) is correct because the long-term attenuation does not depend on fast fading and is substantially constant over the whole bandwidth.

It is also possible to compute contributions to the interference power per PRB, specific for a given interfering e-Node B. In fact, the interference power sustained by the k-th user equipment in the m-th PRB and originated by the i-th e-Node B can be estimated by the serving e-Node B as (in logarithmic units):

$$s_{kmi} = \pi_{im} - a_{ki}, 1 \leq i \leq Q.$$

If a total number of UEs served by the serving e-Node B is U, the interference load of the m-th PRB can be defined as:

$$\lambda_m = \sum_{k=1}^{U} \sigma_{km} \cdot \delta_{km} \quad (6)$$

where $\delta_{km}$ is the activity factor of the k-th UE in the m-th PRB, relative to the last ICIC period. The activity factor $\delta_{km}$ is known to the serving e-Node B and is normalized between 0 and 1. A null value means that the UE does not use the specified PRB.

Moreover, in the 3GPP E-UTRAN LTE system under consideration it is further assumed that the e-Node Bs exchange coordination messages.

In general, the coordination messages are optional messages transmitted by an e-Node B on the X2 interface to the main interfering e-Node Bs, and have the conventional meaning that the source e-Node B has an intention to use a specified PRB in the following ICIC period. As explained in the literature, coordination messages can have in practice many different meanings, depending on the implemented ICIC method. However they can be interpreted in general as the indication that one PRB, which is particularly critical from the point of view of inter-cell interference, will bear, in the following ICIC period, a certain additional interference power originated by the source e-Node B.

The ICIC method according to the present invention operates in cycles having a periodicity much longer than the duration of OFDM symbols. Conveniently, the duration of one ICIC period may last for tens to hundreds of TTIs.

In particular, a coordination message originated in the i-th e-Node B and terminating in the j-th e-Node B, which is one of the main interfering e-Node Bs of the i-th e-Node B, is indicated as follows:

$$K_{ij}^l = \{m, \phi_m\} \quad (7)$$

where $\phi_m$ indicates an additional average power, in comparison with currently transmitted average power, which will be transmitted by the i-th e-Node B on the m-th PRB in the next ICIC period. Index 1 allows to distinguish a plurality of coordination messages which might be exchanged between the same e-Node Bs in the same ICIC period. However, during one ICIC period, only a maximum of one coordination message per PRB can be transmitted from the i-th e-Node B to the j-th e-Node B, i.e., the maximum value of 1 is N.

Moreover, it is also assumed that all vectors (4) and all coordination messages (7) are exchanged exactly at the same time instant over X2 network interfaces, just before the start of an ICIC period. It is clear that in a real implementation the messages can be sent during an ICIC period, provided they can be computed and taken into account for the following ICIC period.

The meaning of equation (7) is only a conventional meaning, because in practice there are a plurality of strategies for deciding to transmit a coordination message.

In particular, a few practical cases in which an e-Node B can decide to transmit a coordination message are hereinafter listed:

1. an e-Node B needs more transmission resources to satisfy overall requests from the respective served UEs, i.e., it plans using one or more PRB(s) that it has not been using so far;
2. an e-Node B needs more transmission power on one PRB to satisfy overall requests from the respective served UEs;
3. an e-Node B demands a decrease of incoming inter-cell interference power on one PRB; and
4. an e-Node B is not satisfied with current allocation of the resources in the neighborhood so it decides to try and trigger a re-shuffle of the radio resources in a subset of the main interfering e-Node Bs.

Messages 1 and 2 are sent by an interfering e-Node B to an interfered e-Node B and are examples of push messages. Messages 3 and 4 are sent by an interfered e-Node B to an interfering e-Node B and are examples of pull messages.

As a general principle, coordination messages are only generated for highly-interfered resources.

Therefore, preferably, a necessary but not sufficient condition to originate a coordination message $\{m, \phi_m\}$ is that:

$$\lambda_m > t_h$$

where $t_h$ is a threshold which depends on the particular system under consideration (e.g. type of 3GPP E-UTRAN LTE system).

Summarizing, the radio resource scheduling method according to the present invention is applicable to a cellular radio communication system wherein the e-Node Bs exchange the coordination messages and the UEs feed back the Channel Quality Indicators (CQIs) to the respective serving e-Node Bs to give a quality measurement of those respective PRBs which have the highest transmission channel quality for the UEs.

Preferably, a characterization of inter-cell interference is performed by the e-Node Bs in the cellular radio communication system and the coordination messages are generated by the e-Node Bs based on an inter-cell interference scenario resulting from the performed characterization of inter-cell interference.

Conveniently, the characterization of inter-cell interference may be performed according to teachings of the above referenced Applicant's international patent applications PCT/EP2007/051302 and PCT/IT2007/000695.

In particular, according to the present invention, a scheduler implemented in a given e-Node B has two types of inputs: the CQIs sent by the UEs served by the given e-Node B, and coordination messages sent by other e-Node Bs interfering the given e-Node B and/or interfered by the given e-Node B.

Preferably, for those radio resources, i.e., PRBs, for which the scheduler has no indication of the respective CQIs, the scheduler may assume a pre-defined value for channel quality, likely a minimum value, or may estimate the respective current CQIs on the basis of old received respective CQIs.

As previously said, coordination messages are optional messages transmitted by the e-node Bs on the X2 interface, directed to the main interferers, and have the conventional meaning that the source e-Node B has an intention to use a specified PRB in the following ICIC period.

As explained in the literature, coordination messages can have in practice many different meanings, depending on the details of the ICIC algorithm implemented in the cellular radio communication system. However they can be interpreted in general as the indication that one PRB which is particularly critical from the point of view of inter-cell interference will bear a certain additional interference power originated by the source e-Node B, in the following ICIC period.

Naturally, the scheduler has also visibility of the usable radio resource table, and of the situation of the queues containing requests to transmit packets.

Moreover, as previously said, the ICIC operates, generally, in cycles having a periodicity much longer than one TTI, while one TTI is also the scheduling period. In practice, it is expected that the duration of one ICIC cycle to last for tens to hundreds of TTIs. In 3GPP LTE systems one TTI (two consecutive sub-frames) contains 14 OFDM symbols and lasts for 1 millisecond.

The fact that one ICIC cycle is much longer than the scheduling period is very important to correctly understand the relationship between scheduling and ICIC.

In fact, the two inputs of the scheduler have very different coherence times. In general CQI values can vary very quickly when in presence of fast fading channels. In other words, coherence time is in the order of one TTI. Instead, the quantities specified by coordination messages remain constant for a whole ICIC period, i.e. tens to hundreds of times longer than one TTI. The scheduling as a process evolves every TTI, and as such is extremely more rapid than ICIC. However, a certain allocation of users on the transmission resources, has a direct effect on interference. Average interference power, in turn, influences ICIC via UE measurements.

In summary, ICIC and scheduling are two mechanisms reciprocally influencing each other, but ICIC is so slow that, as a first engineering approximation, can be considered constant when seen from the scheduling point of view.

Every variation faster than one ICIC period, virtually goes beyond the control of ICIC. ICIC will only see the effect of variations in the interference smoothed out by time averaging. ICIC itself can operate effectively only in case that the interference scenario is relatively constant. As the interference scenario is largely dependent on the scheduling situation of the main interferers, it is obvious that ICIC cannot operate successfully without a scheduling policy specifically designed to support ICIC.

Traditional schedulers (round robin, maximum C/I, proportional fair, etc.) are completely free to alter the scheduling allocation every TTI. Also, they do not have, in general, memory of the average power transmitted on the various PRBs in the past TTIs.

Differently from the traditional schedulers, the present invention proposes a scheduler that, on the contrary, maintains a strict control of average (and instantaneous) transmitted power(s) over one ICIC period. The control can be loosened as a tradeoff for instantaneous performance of the pure scheduling only (without ICIC).

Moreover, according to the present invention the scheduler of an e-Node B is configured to implement a radio resource scheduling which takes into account the coordination messages received by the e-Node B.

Figure 1:
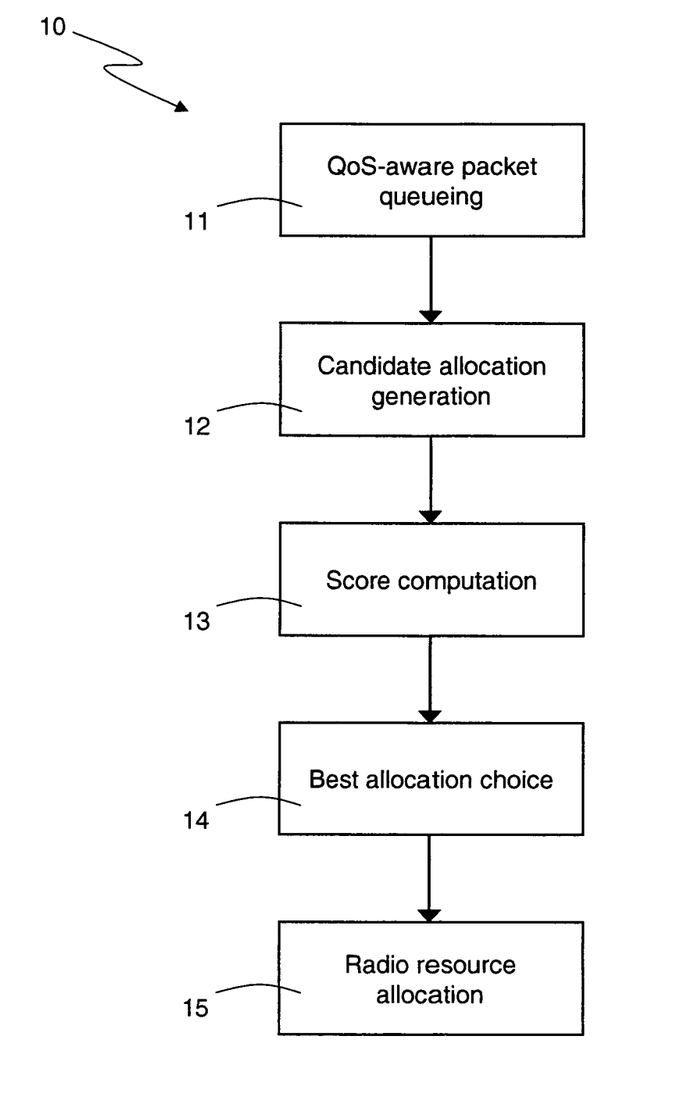

In particular, the attached FIGURE shows a flow chart of an exemplary radio resource scheduling method 10 according to the present invention.

In detail, as shown in the attached FIGURE, the radio resource scheduling method 10 comprises:

a Quality-of-Service-aware (QoS-aware) packet queueing (block 11), which, in turn, comprises building up queues of packets for each UE and, in the most general case, for each service requested by each UE, a time stamp being associated with each packet, and for each packet a corresponding transmission priority being computed depending on the corresponding service and on the corresponding time stamp;

a candidate allocation generation (block 12), which, in turn, comprises generating a set of candidate allocations taking into account Quality of Service (QoS) requirements, each candidate allocation comprising corresponding assignments of radio resources, i.e., PRBs, to respective UEs;

a score computation (block 13), which, in turn, comprises computing for each candidate allocation corresponding scores of the corresponding assignments taking into account corresponding transmission power levels;

a best allocation choice (block 14), which, in turn, comprises choosing among the candidate allocations that candidate allocation which better match ICIC requirements on transmission power; and a radio resource allocation (block 15), which, in turn, comprises allocating the radio resources to respective UEs according to the chosen candidate allocation.

More in detail, a candidate allocation comprises a set of assignments $(m, k, b, \pi)$, where m is an index identifying a PRB, k is an index identifying a UE to which the PRB is assigned in this candidate allocation, b is a number of bits carried by the PRB in this candidate allocation (or, equivalently, the modulation and coding set used for the PRB), and $\pi$ is a transmission power level used to transmit on the PRB in this candidate allocation. $\pi$ does not necessarily have to correspond to the minimum power level necessary to guarantee a given Block Error Rate when b bits are transmitted. It can instead be larger of smaller, depending on the total power budget and the power allocation policy used by the scheduler.

Moreover, a candidate allocation $\Gamma_q$ is written as:

$$\Gamma_q = \{(m_1, k_1, b_1, \pi_1)_q, (m_2, k_2, b_2, \pi_2)_q, \ldots, (m_{A-N}, k_{A-N}, b_{A-N}, \pi_N)_q\} \quad (8)$$

where q is an index identifying the candidate allocation, and where an assumption has been made that all N PRBs are used. As one UE can occupy more PRBs at the same time, in one candidate allocation the values of k can be identical for different assignments comprised in the candidate allocation.

In detail, in the candidate allocation generation (block 12), a first allocation is generated by the scheduler on the basis of the transmission priorities of the packets in the queues. This can happen according to traditional scheduling policies (like round robin, maximum C/I, proportional fair, etc.). Differently from a traditional scheduling policy, however, the scheduler according to the present invention can perturb said first allocation to generate a plurality of candidate allocations. All the generated candidate allocations take into account QoS requirements and may differ for minimum transmission power level requirement on some radio resources.

As an example, in the following a favourite way in which the scheduler can operate to produce multiple candidate allocations will be described.

It is assumed that given radio resources in the wireless communication system, such as distributed PRBs, are dedicated to delay-sensitive services and are not subject to scheduling restrictions due to ICIC. In this case the scheduler firstly assigns those given radio resources, or part of those, to the highest priority services. The remaining radio resources, i.e., concentrated PRBs, are subject to restrictions due to ICIC and must be shared, in general, among those ones of the delay-sensitive services having a relatively lower priority, and the non-real-time services, such as best effort services.

Then, the scheduler allocates the concentrated PRBs according to the transmission priorities of the packets in the queues thus generating a first allocation called root allocation, and thus ensuring that QoS requirements are taken into account.

Next, the scheduler perturbs the root allocation starting from the highly interfered PRBs, i.e., the PRBs for which the e-Node B has received or transmitted one or more corresponding coordination message(s).

In particular, the scheduler, for a given highly interfered PRB assigned to a given UE in the root allocation, finds an alternative UE to which assign the given highly interfered PRB resource, the alternative UE being assigned in the root allocation to a non-highly interfered PRB, and being a UE requiring a lower transmission power than the given UE.

Then, the scheduler swaps the found alternative UE with the given UE.

Alternatively, the transmission power level for the given highly interfered PRB can be lowered, usually by transmitting fewer bits, so the service carried by the given PRB usually being a best effort one.

In detail, given the root allocation:

$$\Gamma_0 = \{(m_1, k_1, b_1, \pi_1)_0, (m_2, k_2, b_2, \pi_2)_0, \ldots, (m_{A-N}, k_{A-N}, b_{A-N}, \pi_N)_0\}$$

the scheduler of the e-Node B is preferably configured to:

generate $\zeta$ perturbed allocations initialized to $\Gamma_0$;

for each PRB $m_x$ for which at least a corresponding coordination message $K_{ij}^l = \{m_x, \phi_{m_x}\}$ has been received or transmitted by the e-Node B, select a random subset of the $\zeta$ perturbed allocations; and in each perturbed allocation in the selected random subset, exchange UE $k_x$ currently assigned to the PRB $m_x$ with a UE $k_y$ which requires a lower transmission power than the UE $k_x$ and is currently assigned to another PRB $m_y$ for which no corresponding coordination messages have been received or transmitted by the e-Node B.

Using a mathematical notation, the exchange of the UE $k_x$ with the UE $k_y$ can be written as follows:

$$(m_x, k_x, b_x, \pi_x) \rightarrow (m_x, \tilde{k}_y, \tilde{b}_y, \tilde{\pi}_y) \text{ and } (m_y, k_y, b_y, \pi_y) \rightarrow (m_y, \tilde{k}_x, \tilde{b}_x, \tilde{\pi}_x)$$

where $$\tilde{\pi}_y < \pi_x, \tilde{b}_y + \tilde{b}_x \leq b_y + b_x,$$

and does not $\exists K_{ij}^l \{m_y, \phi_{m_y}\}$.

Alternatively, given the root allocation:

$$\Gamma_0 = \{(m_1, k_1, b_1, \pi_1)_0, (m_2, k_2, b_2, \pi_2)_0, \ldots, (m_{\Lambda-N}, k_{\Lambda-N}, b_{\Lambda-N}, \pi_N)_0\}$$

the scheduler of the e-Node B is preferably configured to:
generate $\zeta$ perturbed allocations initialized to $\Gamma_0$;
for each PRB $m_x$ for which at least a corresponding coordination message $K_{ij}^l = \{m_x, \phi_{m_x}\}$ has been received or transmitted by the e-Node B,
select a random subset of the $\zeta$ perturbed allocations; and
in each perturbed allocation in the selected random subset, lower transmission power level of UE $k_x$ currently assigned to the PRB $m_x$.

Using a mathematical notation, the lowering of the transmission power level $\pi_x$ of the UE $k_x$ can be written as follows:

$$(m_x, k_x, b_x, \pi_x) \rightarrow (m_x, k_x, \tilde{b}_x, \tilde{\pi}_x)$$

where $$\tilde{\pi}_x < \pi_x, \tilde{b}_x \leq b_x$$

Conveniently, given the root allocation:

$$\Gamma_0 = \{(m_1, k_1, b_1, \pi_1)_0, (m_2, k_2, b_2, \pi_2)_0, \ldots, (m_{\Lambda-N}, k_{\Lambda-N}, b_{\Lambda-N}, \pi_N)_0\}$$

the scheduler of the e-Node B may be configured to:
generate $\zeta$ perturbed allocations initialized to $\Gamma_0$;
for each PRB $m_x$ for which at least a corresponding coordination message $K_{ij}^l = \{m_x, \phi_{m_x}\}$ has been received or transmitted by the e-Node B,
select a random subset of the $\zeta$ perturbed allocations; and
in each perturbed allocation in the selected random subset, choose randomly to exchange UE $k_x$ currently assigned to the PRB $m_x$ with a UE $k_y$ which requires a lower transmission power than the UE $k_x$ and is currently assigned to another PRB $m_y$ for which no corresponding coordination messages have been received or transmitted by the e-Node B, or to lower transmission power level $\pi_x$ of UE $k_x$ currently assigned to the PRB $m_x$.

More conveniently, a different version of the described algorithms implemented by the scheduler to produce multiple candidate allocations could limit the maximum number of differences existing between a perturbed allocation and the root allocation. In a geometrical interpretation of the algorithm, this corresponds to limiting the norm of the vector difference with the root allocation.

The candidate allocations generated by the scheduler in the candidate allocation generation (block 12) do clear a minimum set of requirements on QoS, but still could have a different QoS level. This different QoS level might be exploited later to operate a further selection among allocations, as discussed below.

As previously said, one innovative aspect of the present invention lies in the fact of making the scheduler capable to control average and/or instantaneous power levels over each PRB. In this way the present invention allows to achieve a good compromise between pure scheduling performance, i.e., single-cell performance, corresponding to a choice of radio resource allocations not having any constraints, and a choice of radio resource allocation which is compatible with ICIC operation.

In particular, in the score computation (block 13) the scheduler computes for each assignment in each candidate allocation a corresponding score.

In detail, the score for the assignment of the m-th PRB to the k-th UE with the transmission power level $\pi$ in the $\alpha$-th TTI is written in general as follows:

$$\Omega_\alpha(m, k, \pi) = \beta \cdot f_1[C(m, k)] - \mu \cdot f_2\left[\sum_{l \in \Phi} \phi_m(K_{ij}^l)\right] + \rho \cdot f_3[\pi] \quad (9)$$

where $C(m,k)$ is an estimated transmission capacity associated with the assignment of the m-th PRB to the k-th UE, $\Phi$ is a set of values of l that identify coordination messages for the m-th PRB received or transmitted by the e-Node B, $f_1$ and $f_2$ indicate two optional, generic, monotonic, non-linear functions, $f_3$ is a function used to weigh $\pi$, and $\beta$, $\mu$ and $\rho$ are three positive coefficients that can be modified for network tuning in a first phase, and later can be readjusted by system Operation & Maintenance (O&M) to optimize network throughput depending on traffic conditions, propagation scenario (e.g. microcell or macrocell), Quality of Service (QoS), etc.

The transmission capacity $C(m,k)$ depends on the Signal-to-Noise-plus-Interference Ratio (SNIR) that the k-th UE measures on the m-th PRB, and can be derived from the CQI of the m-th PRB computed by the k-th UE.

In the QoS-aware and ICIC-aware radio resource scheduling method according to the present invention, the score computed according to equation (9) is indicative of an efficiency of the assignment of the m-th PRB to the k-th UE with the transmission power level $\pi$ in terms of transmission capacity associated with this assignment with respect to potential inter-cell interference which would be experienced by the served k-th UE whether assigned to the m-th PRB. Moreover, in the score according to equation (9) the additional term depending on $\pi$ influences the average power transmitted on the m-th PRB. This can be carried out e.g. with a function having a maximum when the power is evolving exactly in the way ICIC prescribes. When a different power level is allocated, the function decreases and can become negative for a situation completely diverging from the one planned for ICIC. This additional term depending on $\pi$ of the score is balanced with other terms during system tuning, to guarantee that pure scheduling performance remains close to an unconstrained scheduler (where unconstrained means non ICIC-aware). The ability of the scheduler to converge toward allocations that are largely optimal from the local cell capacity point of view, while at the same time avoiding allocations that are disruptive for the ICIC policy, depends to a large extent on the ability of the scheduler to perturb the root allocation to obtain alternative ones.

Moreover, a simplified version of the score does not comprise the two non-linear functions $f_1$ and $f_2$:

$$\Omega_\alpha(m, k, \pi) = \beta \cdot C(m, k) - \mu \cdot \sum_{l \in \Phi} \phi_m(K_{ij}^l) + \rho \cdot f_3[\pi] \quad (9')$$

Additionally, in equations (9) and (9') $f_3$ is a function having a maximum for a target power level allocated to the PRB. Then, the function $f_3$ has a decreasing, but positive value, for values close to the target power level, while further away from the target power level, $f_3$ becomes negative.

One example of $f_3$ is defined as follows:

$$f_3(\pi) = \begin{cases} c_2\left(1 - \dfrac{|\pi - P_{target}|}{c_1}\right) & \text{for } |\pi - P_{target}| < \left(1 + \dfrac{k}{c_2}\right)c_1 \\ -k & \text{for } |\pi - P_{target}| \geq \left(1 + \dfrac{k}{c_2}\right)c_1 \end{cases} \quad (10)$$

where $P_{target}$ is the target power level specific for the m-th PRB, as computed on the basis of the coordination messages, while $c_1$, $c_2$ and k are positive constants.

Furthermore, according to a first embodiment of the present invention, the scheduler chooses a candidate allocation just looking at a single TTI, and trying to allocate a transmission power on those PRBs particularly sensitive to outbound inter-cell interference in such a way that it is close to the power level assumed by the ICIC mechanism.

In detail, according to this first embodiment of the present invention, every TTI the scheduler, in the score computation (block 13), computes for each candidate allocation the corresponding scores according to equations (9) or (9') and (10), and then, in the best allocation choice (block 14), computes for each candidate allocation a corresponding total score that is a sum of the corresponding scores, and chooses one candidate allocation having the best, i.e., the highest, total score.

In particular, a candidate allocation $\Gamma_{\tilde{q}}$ is chosen directly by the scheduler in a way such as to satisfy the following equation:

$$\tilde{q} = \underset{q}{\operatorname{argmax}} \sum_{m=1}^{N} \Omega(m, k, \pi), \; (m, k, \pi) \in \Gamma_q \quad (11)$$

where the triples $(m, k, \pi)$ coincide with the triples of the corresponding candidate allocation, and where TTI-dependent index a for simplicity of notation has been omitted.

Instead, according to a second embodiment of the present invention, the scheduler features a memory of the past TTIs and chooses a candidate allocation such that constraints on average power are fulfilled.

In detail, according to this second embodiment of the present invention, the scheduler, in the score computation (block 13), has a memory of $\Lambda$ past TTIs, in the form of $\Lambda$ allocations $\{\Gamma_{q-\Lambda+1}, \ldots, \Gamma_q\}$ and computes for each candidate allocation the corresponding scores according to equation (9) or (9') and further according to a different equation (10') for defining $f_3$.

In particular, according to this second embodiment of the present invention $f_3$ is defined in the following way:

$$f_3(\pi) = f_3(\bar{\pi}) = \begin{cases} c_2\left(1 - \dfrac{|\bar{\pi} - P_{target}|}{c_1}\right) & \text{for } |\bar{\pi} - P_{target}| < \left(1 + \dfrac{k}{c_2}\right)c_1 \\ -k & \text{for } |\bar{\pi} - P_{target}| \geq \left(1 + \dfrac{k}{c_2}\right)c_1 \end{cases} \quad (10')$$

where:

$$\bar{\pi} = \frac{1}{\Lambda} \sum_{i=1}^{\Lambda} \pi_{m, \Gamma_{q-i+1}}$$

and where $$\pi_{m, \Gamma_{q-i+1}}$$

denotes the transmission power levels used on the m-th PRB in the $\Lambda$ past TTIs, i.e., in the $\Lambda$ temporally previous TTIs.

Then, *mutatis mutandis* with respect to the first embodiment, in this second embodiment the scheduler, in the best allocation choice (block 14), chooses that candidate allocation which satisfies the equation (11).

In other words, according to this second embodiment of the present invention, the scheduler tries to favor allocations having an average power which converges to the target power level $P_{target}$.

Furthermore, according to a third embodiment of the present invention, the scheduler does not only produce allocation for the next TTI, but for multiple future TTIs, i.e., for temporally subsequent TTIs. In this case the scheduler can try to fit the various allocations in a way such that the average power level on those PRBs particularly sensitive to outbound inter-cell interference is kept under control. While the next TTI is being transmitted, the allocation of the temporally subsequent TTIs can be reviewed especially in case the newly reported CQIs are different from the predicted ones during the first planning phase.

In detail, according to this third embodiment of the present invention, the scheduler decides the allocations of more than one TTI at the same time.

For example, assuming that the transmission requests already queued are sufficient to fill $\Lambda$ TTIs, a joint allocation process over the total resources of $\Lambda$ TTIs can be performed by the scheduler, thus giving a chance to provide a better control on instantaneous power compared to the allocation per single TTI.

In this third embodiment of the present invention the definition of allocation is modified as follows:

$$\Gamma_q = \{(m_1, k_1, b_1)_q, (m_2, k_2, b_2)_q, \ldots, (m_{\Lambda \cdot N}, k_{\Lambda \cdot N}, b_{\Lambda \cdot N})_q\} \quad (8')$$

Accordingly, the scheduling process involves, in the score computation (block 13), the computation of $\Lambda N$ scores per candidate allocation instead of N per candidate allocation.

Apart from the size of the allocation defined according to equation (8'), the scheduler operates in the same way as the first embodiment.

Moreover, in a still different aspect of this third embodiment, the scheduler can allocate a number of TTIs larger than the number of TTIs that can be filled by currently queued transmission requests. This corresponds to prediction of what could be the temporally subsequent transmission requests and might involve changing the allocations based on what transmission requests actually get into the queues before the TTI is transmitted, as well as based on actual CQI values.

Furthermore, in the first or second or third embodiment of the present invention, it may happen that the scheduler finds, during the best allocation choice (block 14), a plurality of candidate allocations having the same total score. In this case, the scheduler may choose among the found candidate allocations that candidate allocation with the best QoS level.

Finally, during the radio resource allocation (block 15), the scheduler puts in action the chosen allocation via signalling to the UEs etc.

The advantages of the present invention are clear from the foregoing.

Finally, it is clear that numerous modifications and variants can be made to the present invention, all falling within the scope of the invention, as defined in the appended claims.

In particular, it may be appreciated that the present invention may also be theoretically applied to any wireless multi-carrier communication network.

The invention claimed is:

1. A radio resource scheduling method for scheduling radio resources used for communications in a radio communication system which comprises user equipment capable of being configured to communicate with transceiver stations on said radio resources, the transceiver stations capable of being configured to exchange coordination messages concerning radio resources affected by intrasystem interference comprising:
   transmitting a coordination message from a transceiver station containing an indication that particular user equipment that is utilizing a particular radio resource to communicate with that transceiver station is experiencing intra system interference; and
   allocating to user equipment involved with that interference a corresponding radio resource and a corresponding transmission power level based on said coordination message,
   wherein said coordination message contains a request that incoming inter-cell interference power for a particular resource be decreased.

2. The radio resource scheduling method of claim 1, including allocating to each user equipment served by a serving transceiver station a corresponding radio resource and a corresponding transmission power level to communicate with said serving transceiver, which comprises:
   generating a plurality of candidate allocations, each candidate allocation comprising corresponding assignments to said user equipment served by said serving transceiver station of respective radio resources, each assignment comprising a corresponding assigned transmission power level;
   choosing among said candidate allocations a candidate allocation based on said coordination messages exchanged by said serving transceiver station; and
   allocating to each of said user equipment served by said serving transceiver station a corresponding radio resource and a corresponding transmission power level according to the assignments in said chosen candidate allocation.

3. The radio resources scheduling method of claim 1 wherein said coordination message contains a request to re-shuffle radio resources.

4. The radio resource scheduling method of claim 2, wherein each user equipment served by said serving transceiver station requests a corresponding communication service from said serving transceiver station, and wherein generating a plurality of candidate allocations comprises:
   generating a first allocation comprising assignments to said user equipment served by said serving transceiver station of respective radio resources, each assignment comprising a corresponding assigned transmission power level, the first allocation being generated to meet given requirements of quality for the communication services requested by said user equipment served by said serving transceiver station; and
   perturbing said first allocation to generate said candidate avocations.

5. The radio resource scheduling method of claim 2, further comprising:

determining, for each candidate allocation, scores of the corresponding assignments based on quantities indicative of transmission capacities associated with said corresponding assignments, on said coordination messages exchanged by said serving transceiver station, and on the assigned transmission power levels in said corresponding assignment.

6. The radio resource scheduling method of claim 5, wherein, determining, for each candidate allocation, scores of the corresponding assignments, comprises:
   determining, for each assignment, a corresponding score based on a first quantity indicative of a transmission capacity associated with the assignment, on any coordination message or messages exchanged by said serving transceiver station and concerning the radio resource assigned in the assignment, on the assigned transmission power level in the assignment, and on a target power level computed on the basis of any coordination message or messages exchanged by said serving transceiver station and concerning the radio resource assigned in the assignment.

7. The radio resource scheduling method of claim 5, further comprising:
   computing a total score of each candidate allocation based on the scores of the corresponding assignments; and
   wherein choosing among said candidate allocations a candidate allocation comprises: choosing among said candidate allocations a candidate allocation based on computed total scores.

8. The radio resource scheduling method of claim 6, wherein, determining, for each assignment, a corresponding score comprises:
   determining a second quantity indicative of a transmission quality experienced on the radio resource in the assignment by the user equipment to which said radio resource is assigned; and determining said first quantity based on said second quantity.

9. The radio resource scheduling method of claim 6, wherein determining, for each assignment, a corresponding score comprises:
   determining the corresponding score further based on a set of temporally previous transmission power levels previously allocated to communicate on the radio resource which is currently assigned in the assignment.

10. The radio resource scheduling method of claim 7, wherein choosing among said candidate allocations a candidate allocation further comprises:
   choosing a candidate allocation having the highest total score.

11. A radio resource scheduling method for scheduling radio resources used for communications in a radio communication system which comprises user equipment capable of being configured to communicate with transceiver stations on said radio resources, the transceiver stations capable of being configured to exchange coordination messages concerning radio resources affected by intrasystem interference comprising:
   allocating to each user equipment served by a serving transceiver station a corresponding radio resource and a corresponding transmission power level to communicate with said serving transceiver station, the allocating being based on coordination messages exchanged by said serving transceiver station,
   wherein allocating to each user equipment served by a serving transceiver station a corresponding radio resource and a corresponding transmission power level to communicate with said serving transceiver comprises:

generating a plurality of candidate allocations, each candidate allocation comprising corresponding assignments to said user equipment served by said serving transceiver station of respective radio resources, each assignment comprising a corresponding assigned transmission power level;

choosing among said candidate allocations a candidate allocation based on said coordination messages exchanged by said serving transceiver station; and allocating to each of said user equipment served by said serving transceiver station a corresponding radio resource and a corresponding transmission power level according to the assignments in said chosen candidate allocation, wherein each user equipment served by said serving transceiver station requests a corresponding communication service from said serving transceiver station, and wherein generating a plurality of candidate allocations comprises:

generating a first allocation comprising assignments to said user equipment served by said serving transceiver station of respective radio resources, each assignment comprising a corresponding assigned transmission power level, the first allocation being generated to meet give requirements of quality for the communication and perturbing said first allocation to generate said candidate allocations, and wherein perturbing said first allocation to generate said candidate allocations comprises:

generating a plurality of perturbed allocations initialized to said first allocation; and for each radio resource concerned by at least one coordination message exchanged by said serving transceiver station, selecting a random subset of said perturbed allocations, and lowering, in each assignment of the radio resource in the perturbed allocations in the selected random subset, the corresponding assigned transmission power level, said perturbed allocations being said candidate allocations.

12. A radio resource scheduling method for scheduling radio resources used for communications in a radio communication system which comprises user equipment capable of being configured to communicate with transceiver stations on said radio resources, the transceiver stations capable of being configured to exchange coordination messages concerning radio resources affected by intrasystem interference comprising:

allocating to each user equipment served by a serving transceiver station a corresponding radio resource and a corresponding transmission power level to communicate with said serving transceiver station, the allocating based on coordination messages exchanged by said serving transceiver station, wherein allocating to each user equipment served by a serving transceiver station a corresponding radio resource and a corresponding transmission power level to communicate with said serving transceiver comprises:

generating a plurality of candidate allocations, each candidate allocation comprising corresponding assignments to said user equipment served by said serving transceiver station of respective radio resources, each assignment comprising a corresponding assigned transmission power level;

choosing among said candidate allocations a candidate allocation based on said coordination messages exchanged by said serving transceiver station; and allocating to each of said user equipment served by said serving transceiver station a corresponding radio resource and a corresponding transmission power level according to the assignments in said chosen candidate allocation, wherein each user equipment served by said serving transceiver station requests a corresponding communication service from said serving transceiver station, and wherein generating a plurality of candidate allocations comprises:

generating a first allocation comprising assignments to said user equipment served by said serving transceiver station of respective radio resources, each assignment comprising a corresponding assigned transmission power level, the first allocation being generated to meet given requirements of quality for the communication services requested by said user equipments served by said serving transceiver station; and perturbing said first allocation to generate said candidate allocations, and wherein perturbing said first allocation to generate said candidate allocations comprises:

generating a plurality of perturbed allocations initialized to said first allocation; and for each radio resource concerned by at least one coordination message exchanged by said serving transceiver station, selecting a random subset of said perturbed allocations, and exchanging, in each assignment of the radio resource in the perturbed allocations in the selected random subset, a first user equipment, to which the radio resource is currently assigned in the assignment, with a second user equipment, which needs a transmission power level lower than the assigned transmission power level currently in the assignment, and to which a different radio resource is currently assigned, which is not concerned by any coordination message exchanged by said serving transceiver station, said perturbed allocations being said candidate allocations.

13. A radio resource scheduling method for scheduling radio resources used for communications in a radio communication system which comprises user equipment capable of being configured to communicate with transceiver stations on said radio resources, the transceiver stations capable of being configured to exchange coordination messages concerning radio resources affected by intrasystem interference comprising:

allocating to each user equipment served by a serving transceiver station a corresponding radio resource and a corresponding transmission power level to communicate with said serving transceiver station, the allocating being based on coordination messages exchanged by said serving transceiver station, wherein allocating to each user equipment served by a serving transceiver station a corresponding radio resource and a corresponding transmission power level to communicate with said serving transceiver comprises:

generating a plurality of candidate allocations, each candidate allocation comprising corresponding assignments to said user equipment served by said serving transceiver station of respective radio resources, each assignment comprising a corresponding assigned transmission power level;

choosing among said candidate allocations a candidate allocation based on said coordination messages exchanged by said serving transceiver station; and allocating to each of said user equipment served by said serving transceiver station a corresponding radio resource and a corresponding transmission power level according to the assignments in said chosen candidate allocation, wherein each user equipment served by said serving transceiver station requests a corresponding communication service from said serving transceiver station, and wherein generating a plurality of candidate allocations comprises:

generating a first allocation comprising assignments to said user equipment served by said serving transceiver station of respective radio resources, each assignment comprising a corresponding assigned transmission power level, the first allocation being generated to meet given requirements of quality for the communication services requested by said user equipment served by said serving transceiver station; and perturbing said first allocation to generate said candidate allocations, and wherein perturbing said first allocation to generate said candidate allocations comprises:

generating a plurality of perturbed allocations initialized to said first allocation; and for each radio resource concerned by at least one coordination message exchanged by said serving transceiver station, selecting a random subset of said perturbed allocations, and choosing randomly to:

lower, in each assignment of the radio resource in the perturbed allocations in the selected random subset, the corresponding assigned transmission power level; or exchange, in each assignment of the radio resource in the perturbed allocations in the selected random subset, a first user equipment, to which the radio resource is currently assigned in the assignment, with a second user equipment, which needs a transmission power level lower than the assigned transmission power level currently in the assignment, and to which a different radio resource is currently assigned, which is not concerned by any coordination message exchanged by said serving transceiver station, said perturbed allocations being said candidate allocations.

14. A radio resource scheduling method for scheduling radio resources used for communications in a radio communication system which comprises user equipment capable of being configured to communicate with transceiver stations on said radio resources, the transceiver stations capable of being configured to exchange coordination messages concerning radio resources affected by intrasystem interference comprising:

allocating to each user equipment served by a serving transceiver station a corresponding radio resource and a corresponding transmission power level to communicate with said serving transceiver station, the allocating being based on coordination messages exchanged by said serving transceiver station, wherein allocating to each user equipment served by a serving transceiver station a corresponding radio resource and a corresponding transmission power level to communicate with said serving transceiver comprises:

generating a plurality of candidate allocations, each candidate allocation comprising corresponding assignments to said user equipment served by said serving transceiver station of respective radio resources, each assignment comprising a corresponding assigned transmission power level;

choosing among said candidate allocations a candidate allocation based on said coordination messages exchanged by said serving transceiver station; and allocating to each of said user equipment served by said serving transceiver station a corresponding radio resource and a corresponding transmission power level according to the assignments in said chosen candidate allocation and further comprising:

determining, for each candidate allocation, scores of the corresponding assignments based on quantities indicative of transmission capacities associated with said corresponding assignments, on said coordination messages exchanged by said serving transceiver station, and on the assigned transmission power levels in said corresponding assignment, wherein each candidate allocation comprises corresponding temporally subsequent potential assignments to said user equipment served by said serving transceiver station of respective radio resources, each temporally subsequent potential assignment comprising a correspondence temporally subsequent potential assigned transmission power level, the radio resource scheduling method further comprising:

determining, for each candidate allocation, also scores of the corresponding temporally subsequent potential assignments based on quantities indicative of transmission capacities associated with said corresponding temporally subsequent potential assignments, on said coordination messages exchanged by said serving transceiver station, and on the temporally subsequent potential assigned transmission power levels in said corresponding temporally subsequent potential assignments; and computing a total score of each candidate allocation based on the scores of the corresponding assignments and on the scores of the corresponding temporally subsequent potential assignments, choosing among said candidate allocations a candidate allocation comprising: choosing among said candidate allocations a candidate allocation based on the computed total scores.

15. A radio communication system comprising a plurality of radio transceiver stations capable of being configured to communicate with user equipment on radio resources, said system being configured to implement the radio resource scheduling method according to any one of claims 1, 11-13 or 14.

16. A non transitory computer-readable storage medium comprising instructions that, when executed, results in the performance of a method of automatic extraction of information from ongoing voice communications according to any one of claims 1, 11-13 or 14.

* * * * *

UNITED STATES PATENT AND TRADEMARK OFFICE
CERTIFICATE OF CORRECTION

PATENT NO. : 8,467,731 B2  
APPLICATION NO. : 13/503985  
DATED : June 18, 2013  
INVENTOR(S) : Marco Caretti et al.

Page 1 of 1

It is certified that error appears in the above-identified patent and that said Letters Patent is hereby corrected as shown below:

In the Claims:

Claim 4, Col. 17, Line 65, "avocations." should read as --allocations.--.

Claim 14, Col. 22, Lines 29-30, "correspondence" should read as --corresponding--.

Signed and Sealed this  
Twenty-fourth Day of September, 2013

Teresa Stanek Rea  
*Deputy Director of the United States Patent and Trademark Office*